US012224492B2

(12) United States Patent
Song et al.

(10) Patent No.: US 12,224,492 B2
(45) Date of Patent: Feb. 11, 2025

(54) WIDE BEAM RADIATION LEAKAGE COAXIAL CABLE

(71) Applicant: Jiangsu Hengxin Technology Co., Ltd., Jiangsu (CN)

(72) Inventors: Haiyan Song, Jiangsu (CN); Zhonghua Liu, Jiangsu (CN); Jianghua Shen, Jiangsu (CN); Huibing Wang, Jiangsu (CN); Chao Wu, Jiangsu (CN); Xuezi Xu, Jiangsu (CN); Yi Zhou, Jiangsu (CN); Cenjia Lv, Jiangsu (CN); Lingfeng Wang, Jiangsu (CN); Yuanjing Li, Jiangsu (CN)

(73) Assignee: Jiangsu Hengxin Technology Co., Ltd., Wuxi (CN)

( * ) Notice: Subject to any disclaimer, the term of this patent is extended or adjusted under 35 U.S.C. 154(b) by 0 days.

(21) Appl. No.: 17/768,752

(22) PCT Filed: Mar. 8, 2021

(86) PCT No.: PCT/CN2021/079562
§ 371 (c)(1),
(2) Date: Aug. 11, 2022

(87) PCT Pub. No.: WO2022/165910
PCT Pub. Date: Aug. 11, 2022

(65) Prior Publication Data

US 2024/0014567 A1 Jan. 11, 2024

(30) Foreign Application Priority Data

Feb. 3, 2021 (CN) ......................... 202110150012.2

(51) Int. Cl.
*H01Q 13/20* (2006.01)
*H01P 3/06* (2006.01)

(52) U.S. Cl.
CPC ............. *H01Q 13/203* (2013.01); *H01P 3/06* (2013.01)

(58) Field of Classification Search
CPC .... H01Q 13/203; H01Q 1/42; H01B 11/1808; H01P 3/06
See application file for complete search history.

(56) References Cited

U.S. PATENT DOCUMENTS

2010/0001817 A1* 1/2010 Suzuki ................. H01Q 13/203 333/237
2020/0413216 A1* 12/2020 Robertson .......... G07C 9/00309

FOREIGN PATENT DOCUMENTS

CN 2018205030505 10/2018

* cited by examiner

*Primary Examiner* — Lincoln D Donovan
*Assistant Examiner* — Tyler J Pereny
(74) *Attorney, Agent, or Firm* — Jose Cherson Weissbrot

(57) ABSTRACT

The present disclosure provides a wide beam radiation leakage coaxial cable, which includes an inner conductor, an insulating layer, an outer conductor and a sheath coaxially nested from inside to outside in sequence, at least two columns of slot groups are provided on the outer conductor, the columns of slot groups are distributed at different angles in the circumferential direction of the outer conductor, the included angle between two adjacent columns of slot groups is $\alpha=\gamma/n$, where $\gamma$ is the target radiation width, n is the number of columns of slot groups, each column of slot groups includes a plurality of slot arrays periodically arranged in the axial direction of the outer conductor, the pitch of each column of slot groups is the same, the pitch phase of each column of slot groups on the same leakage cable section is consistent, and each slot array includes a plurality of slots.

8 Claims, 3 Drawing Sheets

WIDE BEAM RADIATION LEAKAGE COAXIAL CABLE

TECHNICAL FIELD

The present disclosure relates to leakage coaxial cable technology, in particular to a wide beam radiation leakage coaxial cable.

BACKGROUND

With the development of the leakage cable technology, utilities of a leakage cable has become diversified such as being used as an antenna, and its application is constantly expanding. In the fields of 5G indoor coverage, industrial Internet of Things and the like, the wireless coverage leakage cable solution is increasingly preferred by people for its wide supporting frequency band, uniform radiation, and high stability and reliability. For the application of the popular leakage cable at present, the coverage of the leakage cable is required to be greater (or more complicated). Therefore, it is difficult during indoor cable installation to control slot direction of the leakage cable, and it is also difficult to ensure the consistency of the direction of the leakage cable. Unless widening the transverse lobe angle of the leakage cable is considered, the actual coverage effect will be seriously affected.

In the prior art, patent CN201820503050.5 discloses a wide beam radiation leakage coaxial cable, which splits the original single slot into two or more slot units in order to expand the radial radiation angle of the leakage cable, and at the same time to weaken the influence of the slot length on the high-frequency transmission performance. However, this structure is still a slight deformation of a single radiation source in essence. The distance between each group of slot units cannot be too far, otherwise the signal coverage of the interval area will be weak, so that the requirement of greatly increasing the radiation coverage cannot be met.

SUMMARY

The purpose of the present disclosure is to provide a wide beam radiation leakage coaxial cable which can increase the width of the transverse radiation lobe.

A brief summary of one or more aspects will be given to provide a basic understanding of these aspects. This summary is not an exhaustive overview of all aspects envisaged, and it is neither intended to identify the key or decisive elements of all aspects nor to define the scope of any or all aspects. The sole purpose is to give some concepts of one or more aspects in a simplified form for the order of more detailed description to be given later.

According to one aspect of the present disclosure, there is provided a wide beam radiation leakage coaxial cable, comprising an inner conductor, an insulating layer, an outer conductor and a sheath which are coaxially nested from inside to outside in sequence, wherein at least two columns of slot groups are provided on the outer conductor, the at least two columns of slot groups are distributed at different angles in the circumferential direction of the outer conductor, and the included angle between two adjacent columns of slot groups is $\alpha=\gamma/n$, where $\gamma$ is the target radiation width, n is the number of columns of slot groups, each column of slot groups comprises a plurality of slot arrays which are periodically arranged in the axial direction of the outer conductor, the pitch of each column of slot groups is the same, the pitch phase of each column of slot groups on the same leakage cable section is completely consistent, and each slot array comprises a plurality of slots.

In an embodiment, the number of columns of slot groups is $n=\gamma/\beta$, where $\beta$ is the lobe width of each column of slot groups.

In an embodiment, the slotting parameters of slots of each column of the slot groups in the wide beam radiation leakage coaxial cable are completely consistent.

In an embodiment, the slot is a straight slot, a splay slot, a U-shaped slot, an L-shaped slot, a T-shaped slot, an E-shaped slot or a triangular slot.

In an embodiment, the slot of the wide beam radiation leakage coaxial cable is a U-shaped slot or a splayed slot, two adjacent slots in the axis direction of the outer conductor are central-symmetrically provided, and two adjacent columns of slot groups in the circumferential direction of the outer conductor are capable of completely overlapping with each other after rotating around the axis of the outer conductor by an angle $\alpha$.

In an embodiment, the number of columns of the slot groups of the wide beam radiation leakage coaxial cable is n=2 to 6.

In an embodiment, for the wide beam radiation leakage coaxial cable, when the number of columns of the slot groups is n=3 or 5, and the slot group located in the middle position overlaps with the center line of the narrow side of the outer conductor.

In an embodiment, the distance of the slot group on the unfolded outer conductor is $D=\alpha\pi D_{insulation}/360$ degrees, where $D_{insulation}$ is the outer diameter of the insulation layer.

The embodiment of the present disclosure has the following beneficial effects. By increasing the number of columns of slot groups and distributing the slot groups at different angles in the circumferential direction of the outer conductor, the radiation lobe width of all frequency points (especially higher frequencies) of the leakage cable can be increased in the operating frequency band, so that the radiation lobe width of the leakage cable is widened, and thus the leakage cable has stronger applicability in application scenarios. The problem of partial weak coverage caused by the difficulty in ensuring the consistency between the radiation direction and the laying direction of the leakage cable when the leakage cable is used in the room number distribution system is solved, so that the leakage cable is more suitable for indoor scenarios.

BRIEF DESCRIPTION OF THE DRAWINGS

In order to explain the technical scheme of the embodiments of the present disclosure more clearly, the drawings needed in the embodiments will be briefly introduced hereinafter. It should be understood that the following drawings only show some embodiments of the present disclosure, so as not to be regarded as defining the scope. For those skilled in the art, other related drawings can be obtained according to these drawings without creative efforts.

The above features and advantages of the present disclosure can be better understood after reading the detailed description of the embodiments of the present disclosure in conjunction with the following drawings. In the drawings, components are not necessarily drawn to scale, and components with similar related features or characteristics may have the same or similar reference numerals.

In the figures: 1—inner conductor; 2—insulating layer; 3—outer conductor; 4—sheath; 31—slot group; 311—first slot group; 312—second slot group; 313—third slot group; 32—slot array; 33—slot; 34—center line; 35—overlapping edge.

DETAILED DESCRIPTION OF THE EMBODIMENTS

The present disclosure will be described in detail with reference to the drawings and specific embodiments hereinafter. It should be noted that the aspects described with reference to the drawings and specific embodiments hereinafter are only exemplary and should not be construed as any limitation on the scope of protection of the present disclosure.

Figure 1:
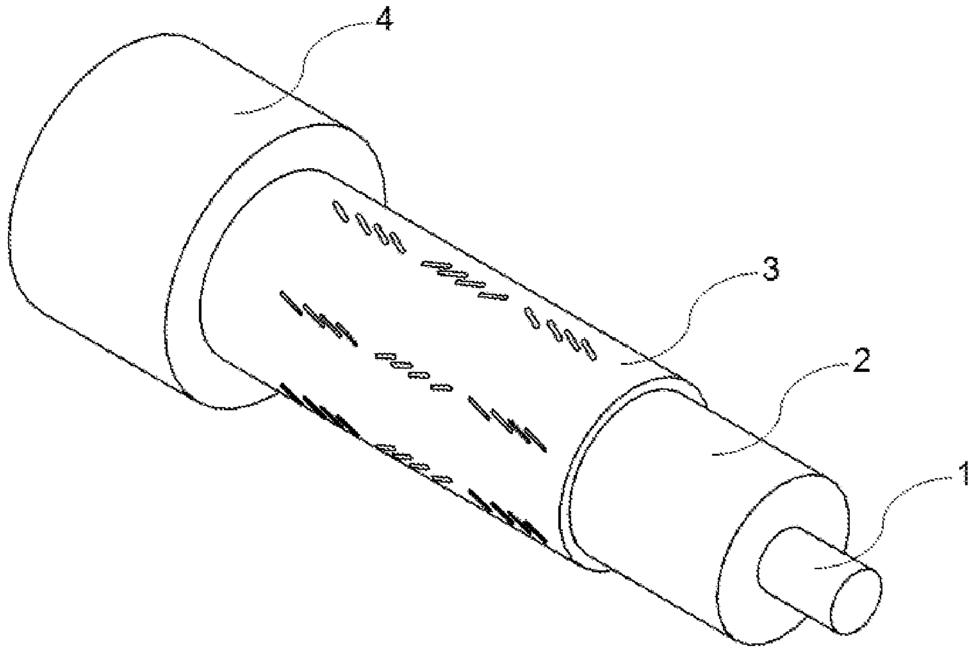
FIG. 1 is a schematic diagram of a three-dimensional structure of an embodiment of the present disclosure.
Figure 2:
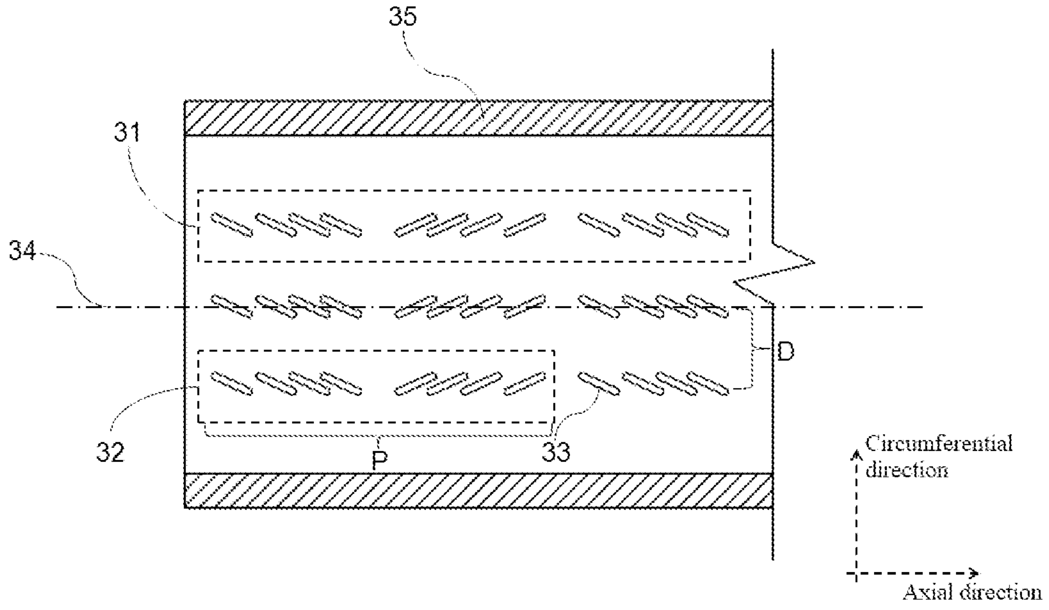
FIG. 2 is an expanded schematic diagram of an outer conductor according to an embodiment of the present disclosure (the slot is a splayed slot).

As shown in FIG. 1 and FIG. 2, the present disclosure provides a wide beam radiation leakage coaxial cable, comprising an inner conductor 1, an insulating layer 2, an outer conductor 3 and a sheath 4 which are coaxially nested from inside to outside in sequence. At least two columns of slot groups 31 are provided on the outer conductor 3. These slot groups 31 are distributed at different angles in the circumferential direction of the outer conductor 3. The included angle between two adjacent columns of slot groups 31 is $\alpha=\gamma/n$, where $\gamma$ is the target radiation width, n is the number of columns of slot groups. As shown in FIG. 2, each column of slot groups 31 comprises a plurality of slot arrays 32 which are periodically arranged in the axial direction of the outer conductor. Each column of slot groups comprises a plurality of slot arrays which are periodically arranged in the axial direction of the outer conductor. The pitch P of each column of slot groups 31 is the same. The pitch phase of each column of slot groups 31 on the same leakage cable section is completely consistent. Each slot array 32 comprises a plurality of slots 33.

By increasing the number of columns of slot groups 31 and distributing the slot groups 31 at different angles in the circumferential direction of the outer conductor 3, the radiation lobe width of all frequency points (especially higher frequencies) of the leakage cable can be increased in the operating frequency band, so that the radiation lobe width of the leakage cable is widened, and thus the leakage cable has stronger applicability in application scenarios.

In the prior art, patent CN201820503050.5 slightly deforms the original single slot group (i.e., radiation source) to form a complex radiation unit, expecting to increase the radial radiation angle of the leakage cable. However, in fact, an effective spatial phase is not formed in space, which belongs to the same radiation source and has limited effect on expanding the radiation angle. In this patent, each group of radiation units should be located on the same straight line (slightly offset at most), not in the same circumferential direction. The distance between different columns of slots cannot be too far, otherwise the signal coverage of the interval area will be weak. In the present disclosure, independent slot groups are added, that is, at least two slots are provided in the same circumferential direction. Because the phases of each slot group are the same, the leakage cable with a wider radiation lobe can be formed by superposition in the same phase, thus solving the problem that the slots need to face the target coverage when the leakage cable is installed.

Figure 5:
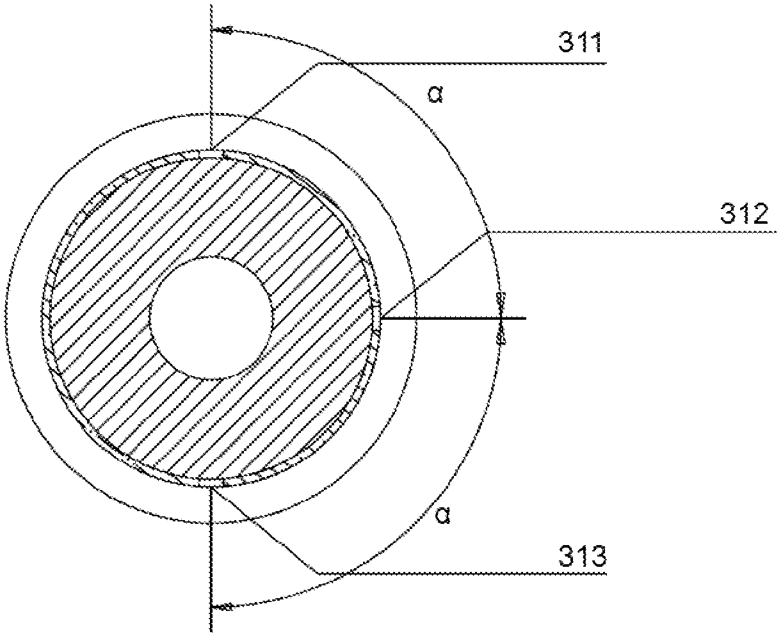
FIG. 5 is a schematic sectional view of an embodiment of the present disclosure.

The radiation lobe width can be controlled by setting the number of columns and distribution angles of the slot groups 31. For example, the insulation outer diameter of a 1⅝-inch leakage cable is 42.0 mm, the lobe width of 3 dB at a certain frequency point is 90 degrees, and it is necessary to increase the lobe width to 270 degrees (that is, the target radiation width), and then $n=\gamma/\beta=270/90=3$, that is, at least three columns of slot groups 31 are needed; $\alpha=\gamma/n=270/3=90$ degrees, that is, the included angle of the slot groups 31 on the cross section of the leakage cable is 90 degrees (minimum included angle); as shown in FIG. 5, the included angles $\alpha$ between the first slot group 311, the second slot group 312 and the third slot group 313 are all 90 degrees.

When processing, it is only necessary to provide slot groups 31 on the unfolded outer conductor 3 at a distance D, $D=\alpha\pi D_{insulation}/360$ degrees, where $D_{insulation}$ is the outer diameter of the insulation layer 2. In the above example, it can be calculated that D=32.97 mm, so that the interval of each column of slot groups 31 on the expanded surface of the outer conductor before longitudinal wrapping is 32.97 mm.

It should be noted that in the present disclosure, the distance D and the included angle $\alpha$ are calculated by the geometric center of the slot 33.

In addition, it should be noted that when the number of columns of slot groups is n=3 or 5 and other odd columns, the slot group 31 in the middle position should be centrally provided. As shown in FIG. 2, the slot group 31 in the middle position overlaps with the center line 34 of the narrow side of the outer conductor, so that the overlapping edge 35 will not block the slot after the outer conductor is longitudinally wrapped.

Figure 3:
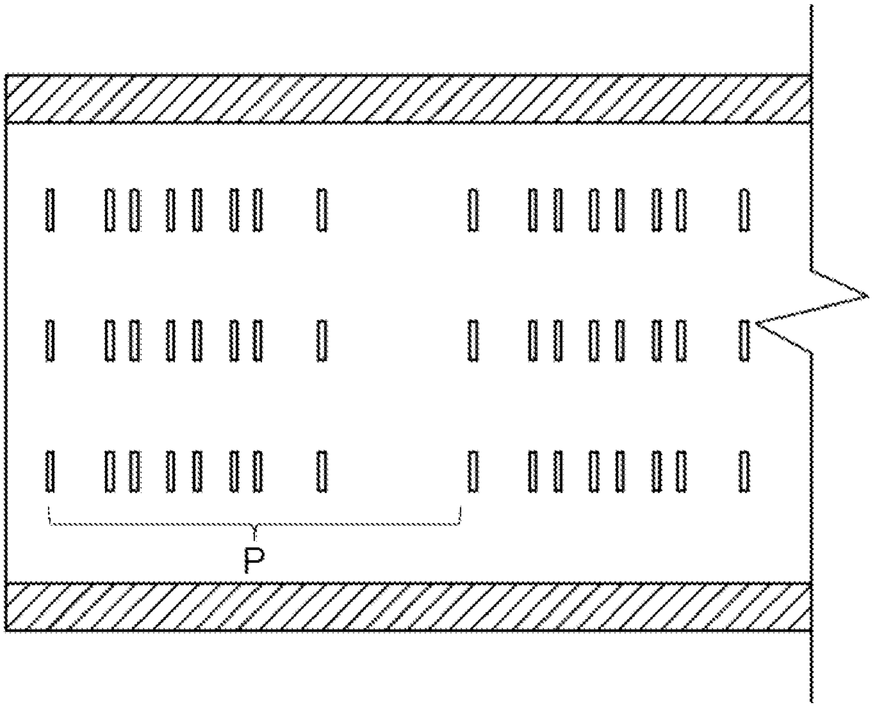
FIG. 3 is an expanded schematic diagram of an outer conductor according to an embodiment of the present disclosure (the slot is a straight slot).

In the present disclosure, the slot 33 can be a straight slot, a splay slot or a U-shaped slot, or other slots such as an L-shaped slot, a T-shaped slot, an E-shaped slot or a triangular slot, which is not limited here. FIG. 3 shows the pitch correspondence of each column of slot groups 31 when the slot 33 is a straight slot. The pitch phases of each column of slot groups 31 should be completely consistent to ensure that the radiation lobes can be overlapped with each other.

Figure 4:
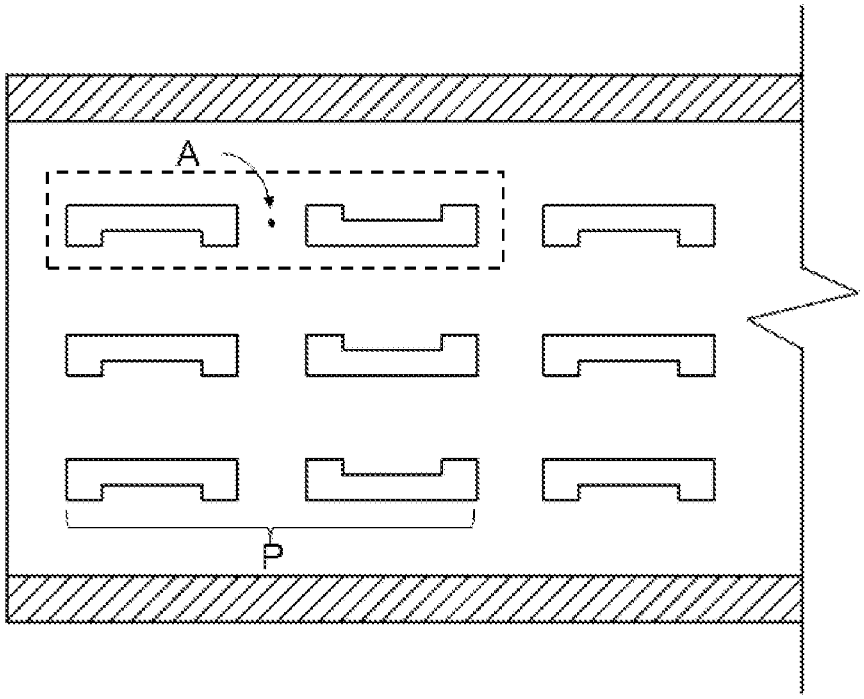
FIG. 4 is an expanded schematic diagram of an outer conductor according to an embodiment of the present disclosure (the slot is a U-shaped slot).

If the slot 33 is a U-shaped slot or a splayed slot, two adjacent slots 33 in the axial direction of the outer conductor 3 can be designed to be central-symmetrically provided (as shown in FIG. 4, two U-shaped slots 33 are central-symmetrically provided about point A). If the target radiation width $\gamma$ is 360 degrees, the slotting parameters of the slots 33 of each column of slot groups 31 can be set to be completely consistent, so that two adjacent columns of slot groups 31 in the circumferential direction of the outer conductor 3 are capable of completely overlapping with each other after rotating around the axis of the outer conductor by an angle $\alpha$. In this way, the 360-degree omnidirectional radiation of the leakage cable can be more uniform.

In this specification, various embodiments are described in a progressive way, each embodiment focuses on the differences from other embodiments, and it is enough to refer to the same and similar parts between various embodiments.

The previous description of the present disclosure is provided to enable those skilled in the art to make or use the present disclosure. Various modifications to the present disclosure will be obvious to those skilled in the art, and the universal principles defined herein can be applied to other variations without departing from the spirit or scope of the present disclosure. Therefore, the present disclosure is not intended to be limited to the examples and designs described herein, but should be given with the widest scope consistent with the principles and novel features disclosed herein.

The above description is only a preferred example of the present disclosure, rather than limit the present disclosure. Any modification, equivalent replacement, improvement, etc. made within the spirit and principle of the present disclosure should be included in the scope of protection of the present disclosure.

The invention claimed is:

1. A wide beam radiation leakage coaxial cable, comprising an inner conductor, an insulating layer, an outer conductor and a sheath coaxially arranged in sequence, wherein at least two columns of slot groups are provided on the outer conductor, wherein the at least two columns of slot groups are distributed at different angles in circumferential direction of the outer conductor, and wherein an angle between two adjacent columns of the at least two columns of slot groups is $\alpha=\gamma/n$, where $\gamma$ is a target radiation width, n is a number of columns of slot groups, wherein each column of the slot groups further comprises a plurality of slot arrays which are periodically arranged in axial direction of the outer conductor, wherein a pitch of each column of slot groups is the same, wherein a pitch phase of each column of slot groups on a same leakage cable section is completely consistent, and wherein each slot array further comprises a plurality of slots.

2. The wide beam radiation leakage coaxial cable according to claim 1, wherein the number of columns of slot groups is $n=\gamma/\beta$, where $\beta$ is a lobe width of each column of slot groups.

3. The wide beam radiation leakage coaxial cable according to claim 1, wherein the slot is a straight slot, a splay slot, a U-shaped slot, an L-shaped slot, a T-shaped slot, an E-shaped slot or a triangular slot.

4. The wide beam radiation leakage coaxial cable according to claim 3, wherein the slot is a U-shaped slot or a splayed slot, and wherein two adjacent slots in the axis direction of the outer conductor are provided central-symmetrically.

5. The wide beam radiation leakage coaxial cable according to claim 1, wherein two adjacent columns of slot groups in the circumferential direction of the outer conductor are capable of complete overlap with each other after rotating around an axis of the outer conductor by the angle $\alpha$.

6. The wide beam radiation leakage coaxial cable according to claim 1, wherein the number of columns of the slot groups is n=2 to 6.

7. The wide beam radiation leakage coaxial cable according to claim 6, wherein when the number of columns of the slot groups is n=3 or 5, and the slot group located in a middle position overlap with a center line of a narrow side of the outer conductor.

8. The wide beam radiation leakage coaxial cable according to claim 1, wherein a distance of the slot group on an unfolded outer conductor is $D=\alpha\pi D_{insulation}/360$ degrees, where $D_{insulation}$ is an outer diameter of the insulation layer.

* * * * *